Jan. 12, 1960 W. T. SELSTED ET AL 2,921,143

MULTIPLE CHANNEL HEAD ASSEMBLY

Filed May 31, 1955 2 Sheets-Sheet 1

INVENTORS
WALTER T. SELSTED
HAROLD W. LINDSAY
BY
Flehr & Swain
ATTORNEYS

Jan. 12, 1960 W. T. SELSTED ET AL 2,921,143

MULTIPLE CHANNEL HEAD ASSEMBLY

Filed May 31, 1955 2 Sheets-Sheet 2

INVENTORS
WALTER T. SELSTED
HAROLD W. LINDSAY

BY Flehr & Swain

ATTORNEYS

United States Patent Office 2,921,143

Patented Jan. 12, 1960

2,921,143

MULTIPLE CHANNEL HEAD ASSEMBLY

Walter T. Selsted and Harold W. Lindsay, Redwood City, Calif., assignors to Ampex Corporation, Redwood City, Calif., a corporation of California Application May 31, 1955, Serial No. 512,018

4 Claims. (Cl. 179—100.2)

This invention relates generally to multichannel transducer head assemblies for magnetic tape recording and/or reproducing equipment, and to methds for their manufacture.

Conventional transducer heads such as are employed in magnetic tape equipment consists of a magnetic core provided with windings and pole tips separated by a thin gap of non-magnetic material. During recording and reproducing operations the pole tips are in contact with the coated side of the tape, with the plane of the gap disposed perpendicular to the tape. For multichannel operations the head assembly consists of a plurality of transducer units carried by a common mounting means and separated by suitable magnetic and electrostatic shielding. Assuming that the equipment is designed to record and reproduce with a high degree of fidelity, the construction of the multichannel transducer head assemblies involves many problems. Particularly the construction must have such accuracy that all of the transducer units contact the tape with uniform pressure, and whereby the alinement is such as to insure recording and reproducing operations without undesired phase displacements between channels and with optimum fidelity.

In general it is an object of the present invention to provide a multichannel transducer head assembly for magnetic tape equipment which will permit manufacture to a high degree of accuracy and uniformity.

Another object of the invention is to provide a novel method for the manufacture of multichannel transducer head assemblies, which will make possible quantity production while at the same time enabling the desired degree of accuracy and uniformity.

Additional objects and features of the invention will appear from the following description in which the preferred embodiment has been set forth in detail in conjunction with the accompanying drawings.

Referring to the drawings.

Figure 1:
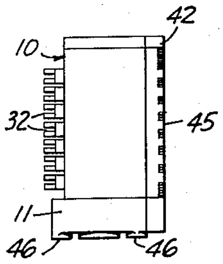
Figure 1 is a side elevational view illustrating a multichannel transducer head incorporating the present invention, and made in accordance with the present procedure.
Figure 2:
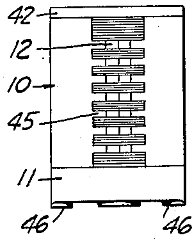
Figure 2 is a front view of the head assembly shown in Figure 1.

The completed head assembly shown in Figures 1 and 2 consists of a body 10 that mounts the transducer units, and which is normally carried by the metal base 11. The operating face of the head assembly, that is the face which contacts the tape, is provided with exposed pairs of pole tips 12, adapted to operate upon spaced parallel areas of the tape.

Additional structural features of the head assembly can best be understood after a description of the preferred procedure for its manufacture.

Figure 3:
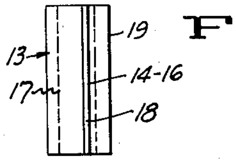
Figure 3 is a side elevational view of one of the mounting members used in the assembly.
Figure 4:
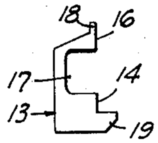
Figure 4 is an end view of the mounting members shown in Figure 3.
Figure 5:
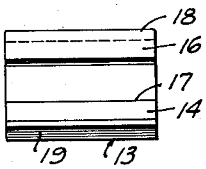
Figure 5 is an elevational view looking toward the right side of Figure 3.

Mounting members 13 such as shown in Figures 3–5 form an important part of the assembly. There are two such members in the assembly, and during the process of manufacture parts of the transducer units are attached to these members. Each member 13 preferably is formed of suitable molded insulating material, such as a phenolic condensate product, and the shaping is such as to provide two spaced shoulders 14 and 16 located in a common plane. In the particular shaping shown in Figure 4, the shoulders 14 and 16 are separated by the recess or cavity 17. The front edge of each member 13, that is the edge which is adjacent the front operating face of the complete head assembly, is provided with a fin 18. The rear of each member 13, which in a complete head assembly is at the rear face of the head, is formed with a flange or rib 19 that extends at right angles to the shoulder 14.

Figure 6:
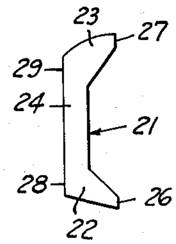
Figure 6 is a plan view showing a magnetic core part such as is used in our assembly.
Figure 7:
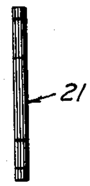
Figure 7 is an end view of the core part shown in Figure 6.

Figures 6 and 7 show laminated core parts of magnetic material, which can be used to make the transducer units. Each core part 21 can be generally U-shaped, with the end portions 22 and 23 integral with the intermediate portion 24. In practice these core parts can be made by assembling laminations of high permeability material, with suitable cement for holding the laminations together. After forming such core parts, suitable grinding operations are carried out whereby the end portions 22 and 23 are formed to a uniform predetermined thickness. Also the end faces 26 and 27 preferably are lapped or otherwise machined at this point, whereby they are made true with respect to a common plane. In addition the rear faces 28 and 29 are lapped or otherwise machined whereby they are made true with respect to a common plane at right angles to the side faces of portions 22 and 23, and with a predetermined spacing with respect to the common parallel plane of the end faces 26 and 27.

Figure 8:
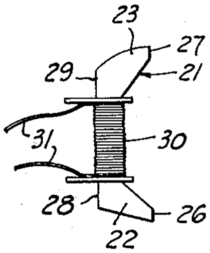
Figure 8 is a view like Figure 6 but with a winding applied to the core part.

After the core parts have been formed in the manner described above, suitable windings 30 are applied as shown in Figure 8. The number of turns and the gauge of the wire employed will depend upon the electrical characteristics desired.

Assuming that the requisite number of wound core parts have been formed as shown in Figure 8, the next step in the manufacturing procedure is to assemble a number of such parts upon the mounting member 13. A suitable self-setting cement is applied to the rear faces 28 and 29 and to the edge faces of portions 22, and a number of such core parts are assembled upon a mounting member in the manner illustrated in Figures 9 and 10. This procedure requires the use of a suitable jig or fixture for maintaining the core parts in accurate spaced relationship and extending at right angles to the shoulder faces 14 and 16. At the time the core parts are assembled upon the mounting members, the lead wires 31 from the windings can be inserted through suitable openings and connected to the terminals 32.

Accurate location of the core parts upon the mounting members is facilitated by the rib 19. It will be noted that the edge face of each core portion 21 is brought into contact with the adjacent edge of rib 19, thus facilitating the accurate alinement of the end faces 26 and 27. The cemented attachments at the points of contact with rib 19 facilitates retention of the core parts with sufficient strength for subsequent lapping.

Figure 10:
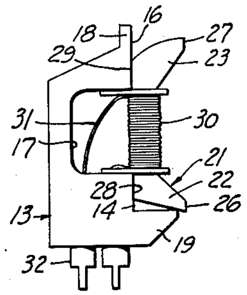
Figure 10 is a top view showing the intermediate assembly of Figure 8.
Figure 9:
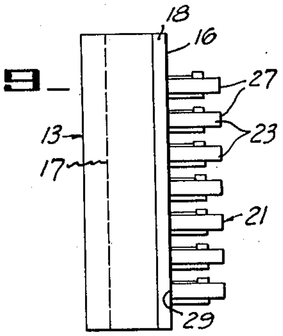
Figure 9 is a side elevational view showing the mounting member with core part such as shown in Figure 8, applied to the same.

After the cement has hardened the assembly of Figures 9 and 10 can be removed from the holding jig or fixture employed. Operation is carried out by engaging these end faces with a common lapping surface.

The next step is to lap or otherwise accurately finish the end faces 26 and 27 whereby they are made true with respect to a common plane.

Figure 11:
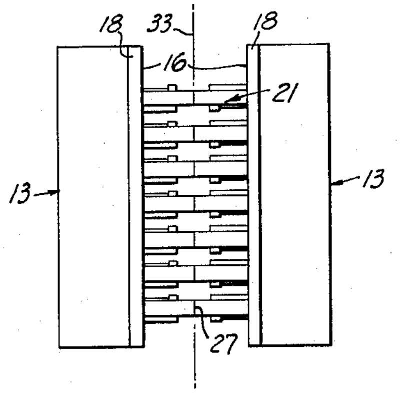
Figure 11 is a side elevational view showing two assemblies such as shown in Figures 9 and 10, being placed in juxtaposition preparatory to forming the final assembly.

By means of another suitable holding jig, two of the assemblies shown in Figures 9 and 10 are then brought together in the manner illustrated in Figure 11, with the lapped end faces 26 and 27 of the several core parts in accurate apposition. A thin metal strip 33 of suitable nonmagnetic material is positioned between the end faces 27, to provide the desired nonmagnetic gaps. If desired a similar strip can be placed between the end faces 26. Considerable mechanical pressure is applied to force the pairs of core parts together, and whereby portions of the strip 33 that are not interposed between the core faces, can be removed. This procedure leaves individual nonmagnetic gaps between the faces 27.

Figure 15:
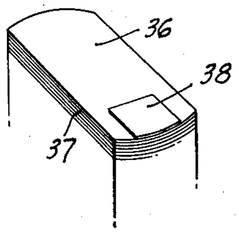
Figure 15 is an isometric view of a shim assembly.

The next step following preparation of the assembly shown in Figure 11 (and while the two parts are held together under pressure), is to apply electromagnetic and electrostatic shielding between the core parts. Suitable electrostatic shielding is shown in Figure 15. Thin shims 36 are formed of suitable metal of high magnetic permeability. Interposed members 37 are formed of nonmagnetic electrical conductive material, such as copper. The exterior ones of the shims 36 can be provided with areas 38 covered with insulating material, to protect against short circuiting. Shim assemblies such as shown in Figure 15 are manually inserted between the pole parts in the manner illustrated in Figures 12 and 13. It will be noted that the insertion of these shim assemblies is guided by the shoulder surfaces 14 and 16, and that the shims are likewise located by abutting contact with the ribs 19. After insertion of the shim assemblies, the edges of the shims at the front operating face of the complete assembly, may extend a short distance beyond the adjacent surfaces of the core parts.

Figure 12:
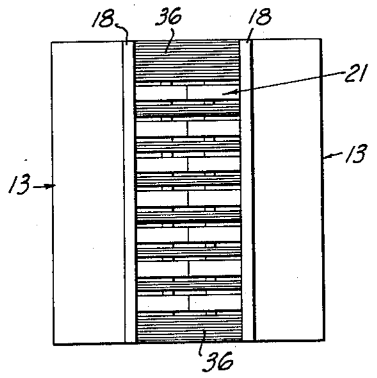
Figure 12 is a view like Figure 11 but with electromagnetic and electrostatic shielding shims applied.
Figure 13:
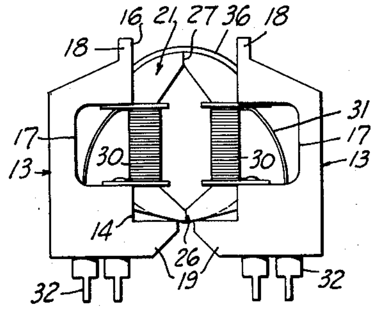
Figure 13 is a top view of the assembly shown in Figure 12.

Following preparation of the assembly shown in Figures 12 and 13, it is prepared for a molding operation in which the cavities between the mounting members 13 and between the core parts, are completely filled with a suitable synthetic resin. Preliminary to such a molding operation a filler strip 41 is positioned between the ribs 19, and a top plate 42 of suitable insulating material is applied upon the upper ends of the member 13. The base member 11 may at this time be assembled adjacent the lower ends of the mounting members 13, or if desired it may be so positioned at the time the core parts are brought into apposition as shown in Figure 11. Suitable mold parts are applied, including a part adapted to establish a seal over the area between the fins 18. A suitable self-setting resin is now poured into the assembly to fill all of the inner spaces. During and following the molding operations, and in fact from the time the core parts are placed in apposition in the manner shown in Figure 11, mechanical pressure is maintained to force the core parts together, whereby when the resin hardens and sets, it bonds the assembly into a unitary structure with the pole parts pressed together.

Figure 14:
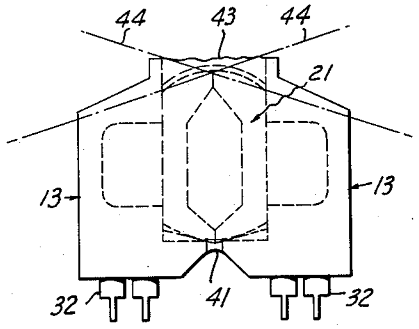
Figure 14 is a top view of the assembly after a molding operation, and before final finishing operations to produce the finished assembly of Figures 1 and 2.

When taken from the mold the complete assembly may appear as shown in Figure 14. A considerable amount of resin, as indicated at 43, covers the portions 23 of the core parts. To finish the assembly the excess material 43, together with the fins 18, are removed substantially to the lines of 44 of Figure 14. Continued grinding, lapping and polishing operations serve to expose the pole tips 12 in the manner shown in Figure 2, and to remove projecting edges of the shielding shims. As a result an accurate arcuate surface 45 is formed for contact with the tape. The pads 46 on the metal base 11 are finished as by grinding and lapping, whereby their end faces are in a common plane precisely at right angles to a line coincident with the magnetic gaps and coincident with the arcuate surface 45. The provision of such a base facilitates accurate mounting of the assembly on magnetic tape recording and/or reproducing equipment.

The complete assembly described above has many desirable features. The pole tips and the magnetic gaps between the tips are accurately alined, and the faces of the tips are accurately located with respect to the surface in contact with the tape. The assembly can be manufactured on a quantity basis with a high degree of uniformity. The construction, and the process employed for manufacture, makes possible the desired accuracy, with a minimum number of rejects. Furthermore the construction and the process of manufacture facilitate the various manual operations required during manufacture, and minimizes the effect of the human factor upon the quality of the finished product.

We claim:

1. A multichannel transducer head assembly for use with magnetic tape comprising a pair of mounting members of rigid insulating material, each having two flat parallel shoulder surfaces extending continuously for the length thereof, a plurality of spaced parallel magnetic core parts, each part having flat shoulder surfaces contiguous to the shoulder surfaces of said mounting members and fixedly cemented thereto in spaced relationship to adjacent core parts, each core part being substantially U-shaped and having extremities terminating in end faces that are located in a common plane, said core parts being so located by said shoulder surfaces that all of the end faces of said extremities are aligned and in apposition with corresponding end faces of the other core parts whereby a cooperating pair of core parts forms a magnetic core of a transducer unit for one channel, a relatively thin sheet of nonmagnetic material interposed between the end faces at the front of the assembly, electrostatic and electromagnetic shielding means disposed between said pairs, and insulating means filling the spaces between said mounting members and said core parts and serving to bond the mounting members and the core parts together to form a unitary assembly.

2. An assembly as in claim 1 in which each of said mounting blocks includes a rib extending for the length thereof and serving to abut adjacent extremities of the core parts to locate the core parts in conjunction with said shoulder surfaces.

3. A sub-assembly for a multichannel magnetic transducer head of the type adapted for use with magnetic tape, said sub-assembly comprising a mounting member of rigid insulating material having two flat parallel shoulder surfaces extending continuously for the length thereof, a plurality of spaced parallel magnetic core parts each having flat shoulder surfaces that are contiguous to the shoulder surfaces of the mounting member and fixedly cemented thereto, each core part being substantially U-shaped and having extremities terminating in end faces that are located in a common plane, the spacing of said core parts forming free spaces of uniform width between the same, and a winding upon that portion of each core part which is located between the shoulder surfaces of the same.

4. A sub-assembly as in claim 3 in which the mounting member includes a rib extending for the length thereof, said rib projecting laterally from the plane of said shoulder surfaces and being in abutting engagement with adjacent extremities of the core parts.

References Cited in the file of this patent

UNITED STATES PATENTS

| | | |
|---|---|---|
| 2,020,212 | Quam | Nov. 5, 1935 |
| 2,456,767 | Camras | Dec. 21, 1948 |
| 2,676,392 | Buhrendorf | Apr. 27, 1954 |
| 2,677,019 | Buhrendorf | Apr. 27, 1954 |
| 2,732,275 | MacNeil | Jan. 24, 1956 |
| 2,751,440 | DeTurk | June 19, 1956 |
| 2,756,280 | Rettinger | July 24, 1956 |
| 2,769,036 | Selsted | Oct. 30, 1956 |
| 2,769,866 | Kornei | Nov. 6, 1956 |
| 2,835,742 | Moehring et al. | May 20, 1958 |